United States Patent [19]

Rubel et al.

[11] Patent Number: 5,189,615
[45] Date of Patent: Feb. 23, 1993

[54] SEMI-ACTIVE SUSPENSION CONTROL

[75] Inventors: Erich Rubel, Ludwigsburg; Karl-Heinz Haegele, Vaihingen/Enz; Michael Panther, Leonberg-Gebersheim; Klaus Gatter, Winnenden, all of Fed. Rep. of Germany

[73] Assignee: Robert Bosch GmbH, Stuttgart, Fed. Rep. of Germany

[21] Appl. No.: 654,641

[22] PCT Filed: May 12, 1990

[86] PCT No.: PCT/DE90/00340

§ 371 Date: Feb. 14, 1991

§ 102(e) Date: Feb. 14, 1991

[87] PCT Pub. No.: WO91/00187

PCT Pub. Date: Jan. 10, 1991

[30] Foreign Application Priority Data

Jun. 29, 1989 [DE] Fed. Rep. of Germany ....... 3921324
Sep. 13, 1989 [DE] Fed. Rep. of Germany ....... 3930555

[51] Int. Cl.[5] .............................................. B60G 17/015
[52] U.S. Cl. ................... 364/424.05; 280/707; 188/267
[58] Field of Search ............. 364/424.01, 424.05; 280/707; 188/267, 299

[56] References Cited

U.S. PATENT DOCUMENTS

| | | | |
|---|---|---|---|
| 4,598,929 | 7/1986 | Kumagi et al. | 280/707 |
| 4,804,203 | 2/1989 | Glab et al. | 364/424.01 X |
| 4,828,283 | 5/1989 | Ishii et al. | 364/424.05 X |
| 4,838,574 | 6/1989 | Baraszu | 364/424.01 X |
| 4,896,752 | 1/1990 | Shtarkman | 188/267 X |
| 4,924,393 | 5/1990 | Kurosawa | 364/424.05 |
| 4,936,423 | 6/1990 | Karnopp | 188/299 |
| 4,989,148 | 1/1991 | Gürke et al. | 364/424.05 |
| 5,014,829 | 5/1991 | Hare, Sr. | 188/267 |
| 5,016,908 | 5/1991 | Athanas et al. | 280/707 |
| 5,020,825 | 6/1991 | Lizell | 280/707 |
| 5,056,813 | 10/1991 | Shibata et al. | 280/707 |
| 5,080,391 | 1/1992 | Kawabata | 280/707 |
| 5,090,728 | 2/1992 | Yokoyama et al. | 280/707 |

Primary Examiner—Thomas G. Black
Assistant Examiner—Thomas S. Auchterlonie
Attorney, Agent, or Firm—Baker & Daniels

[57] ABSTRACT

The invention concerns a method and a device for the suspension control of vehicles, in particular motorcars and commercial vehicles, with the following steps:

Sensory ascertainment of the dynamic rolling condition and processing of the established rolling condition data, to generate a control signal for a semi-active damper, preferably one allocated to each wheel of the vehicle, the damping force of which is adjustable in certain situations which are dependent on the driving condition, to as small a value as possible. It is suggested that the semi-active damper, depending on the control signal and the actual value of the damper force is set in substitution for an active damper function which though desired with regard to the prevailing operating point, is not however achievable, this substitute setting being made with maximum hardness or maximum softness.

7 Claims, 4 Drawing Sheets

SEMI-ACTIVE SUSPENSION CONTROL

STATE OF TECHNOLOGY

The invention concerns a method for the suspension control of vehicles, in particular motorcars and commercial vehicles, with the following steps: sensory ascertainment of the dynamic rolling condition and processing of the established rolling condition data, to generate a control signal for a semi-active damper, preferably one allocated to each wheel of the vehicle, the damping force of which is adjustable in certain situations which are dependent on the driving condition, to as small a value as possible.

The design of suspension control systems always demands a compromise between comfort and safety of travel. An ideal suspension should absorb the vibrations occasioned due to unevennesses in the road surface, at the same time maintaining the wheel contact forces as constant as possible at a predetermined value, since the wheels will thereby obtain the best lateral traction, thus controlling the vehicle with maximum safety.

Conventional vehicles have a passive damping system, which means that a damper is arranged parallel with the spring arrangement of a wheel, and this damper has a particular fluid damped piston. Tensive and compressive forces effect a displacement of fluid, whereby the fluid passes through a valve opening area.

In an active suspension control, actuators are employed which have a cylinder divided by a piston into two operating chambers. A pressure medium can (actively) be admitted into or discharged from the two operating chambers, so that, depending on the pressure medium, any desired force can be set. If the damping force is shown over the piston speed in a cartesian coordinate system, then the characteristic curve can be in all four quadrants, i.e. deviating from the passive system, where the operating points can be only in the first and third quadrant (positive damping force and positive piston speed; negative damping force and negative piston speed), it is possible with active damping to achieve negative piston speeds even with positive damping force, and positive piston speeds with negative damping force. By employing the appropriate energy for the control of the pressure medium, the wheel assigned to the suspension in an active system can be moved up and down so quickly that it follows the unevennesses of the road, making the requirements for an optimum suspension design very nearly fulfilled. However, the active system requires a correspondingly high expenditure in apparatus and energy.

Good results are also obtained with a semi-active suspension control which is far superior to the conventional, passive systems. In a semi-active system, the damper hardness can be adjusted. To this end, a semi-active damper has a controllable valve opening area for the pressure medium which is displaced by the piston. Depending on the rolling condition, the damper force is matched to the prevailing conditions, by adjusting the valve opening area of a regulating system.

Semi-active suspension control systems have become known, in which the damping characteristic can be changed over from being related to the road condition and/or rolling condition, thus providing a variation of the damping characteristic. However, this enables the damping characteristic to be only approximately matched to the current requirements, and to do this in successive steps, in such a way, for example, that with a smooth road surface and an even travelling speed, minor damping is obtained, and with an uneven road surface or dynamic travelling manoeuvres (braking, rapid steering manoeuvres), higher damping is achieved. The obtainable results cannot fulfil high requirements.

From the DE-OS 35 13 128, a device for damping progressive movements is known, which employs a semi-active damping system, the characteristic of which is to be approximately matched to an active system. For this purpose, it is intended that the damping system should be capable of being arranged, dependent on certain operating conditions which are detected by sensors, into a condition in which the damping force is nearly zero. This condition is always switched in when an energy infeed would take place under the assumption that an active system is used. Thus, the semi-active damper is switched in to those ranges in which energy would be fed to an active system, or in which a passive system would destroy energy, in such a way that the damping force is as small as possible. Considerable advantages over a passive system can be obtained, but there is still a demand for better solutions.

ADVANTAGES OF THE INVENTION

The method according to the invention, with the characteristics mentioned in the main claim, has the advantage that a damping characteristic largely inherent in the active system can be achieved, although no forces have to be provided for the active pressure medium supply. A semi-active damper is rather used, in which the setting energy required for varying the cross-section is relatively small, dependent on type. If the suspension control requires operating points on the semi-active damper, preferably allocated to each wheel of the vehicle, which can be be implemented on the basis of the semi-active damper function, then these operating points are assumed. If operating points are specified against which driving is not possible due to the semi-active damper, since they require an active damper function (four quadrant operation), then a substitute setting of the semi-active dampers is made in accordance with the invention. This is made on every semi-active damper—i.e. on every wheel of the vehicle—dependent on a control signal and on the current actual value of the damping force of the relevant damper, with a setting of either maximum hardness or maximum softness of the damper being made, depending on the evaluation result of the control signal and the actual value. The control signal results from data ascertained by sensors and subsequently processed, of the momentarily obtaining dynamic rolling conditions of the vehicle. In particular, a status controller is used which ascertains from the data the current optimum damping force in respect of each wheel of the vehicle. In contrast to a passive damper, a semi-active damper does not have a characteristic curve, but a performance graph, since the valve opening area can be varied irrespective of the piston speed, by the aforementioned control signal. With a semi-active damper, it is therefore possible to set any number of pairs of damping force and piston speed values, which do however lie within certain limits. These are predetermined by the end positions of the continuously variable valve opening area. In the damping force/piston speed diagram, the minimum opening area provides a first limiting characteristic and the maximum valve opening area provides a second limiting characteristic. With a semi-active damper, it is therefore possible, by means of appropriate control signals, to set all pairs of values for damping force and piston speed which lie in the first and third quadrant between the limiting characteristics mentioned. There are also limits conditioned by design and operation; these are the maximum damping force and the maximum piston speed. All pairs of values outside the stated limits, in particular those which exist in the second and fourth quadrant, cannot be achieved with a semi-active damper. In certain situations, however, an optimum suspension control requires operating points specified by the pairs of values, i.e. points which are outside the shown limits in the first and third quadrant, respectively, but which cannot be implemented due to the semi-active system, as mentioned. In such a case, the substitute setting provided by the invention is made which effects a close approximation to the properties of an active system, yet still retains the advantages of the semi-active system in respect of the apparatus set-up and the energetic management.

It is especially envisaged that the substitute setting is retained long enough until an operating point is again obtained which the semi-active damper can implement. The substitute setting in accordance with the invention is thus made only during the active system phases; continuous monitoring of the current operating point takes place, so that with pairs of values achievable by the semi-active system, switch-back is made immediately from the substitute setting to the normal semi-active operation.

To determine the substitute setting, the product is formed preferably from the control signal and the actual value of the damping force, and in the case of a negative sign of this product, the substitute setting is made.

As a decision criterion for a damper setting of maximum hardness or maximum softness, the amount of the piston speed is used which exists at that moment at which a substitute setting of the damping force becomes necessary. The damper is set at maximum hardness, as an alternative, when the amount of the piston speed is below a limit speed. An alternative setting of maximum softness is used, when the amount of the piston speed is above the limit speed. The limit speed can be predetermined.

The control signal is preferably a control voltage. This is supplied be the previously mentioned controller; it takes a linear course.

Since a semi-active damper has a non-linear behaviour in terms of its drive, the linear control voltage supplied by the controller is preferably transformed into an actuating voltage matched to the non-linear control behaviour of the damper. This task is performed by a compensating circuit.

The following input variables are used as travel condition parameters: relative spring deflection path, wheel acceleration, damping force, body acceleration, road unevenness and road unevenness speed.

The damping forces are determined in a manner such that on steering the vehicle into a bend, a slight oversteer behaviour is produced, and on returning the steering to straight ahead position, a slight understeer behaviour is produced.

Semi-active dampers, preferably operating by the electro-rheological principle, can be used.

The invention further concerns a device for the suspension control of vehicles, in particular for motorcars and also commercial vehicles, with sensors which detect the dynamic rolling condition, the rolling condition data of which is fed to a signal processing circuit for generating a control signal, and with dampers preferably one allocated to each wheel of the vehicle, the damping force of these being adjustable, in certain rolling condition dependent situations, to a value as small as possible. Each semi-active damper is set, as an alternative, depending on the control signal and the actual value of the damping force, for an active damper function which is desired but not attainable, of maximum hardness or maximum softness (substitute setting). The signal processing circuit will preferably have at least one comparator to compare the amount of the piston speed with the limit speed.

DRAWING

The invention is more fully explained hereafter by means of the illustrations, which show.

DESCRIPTION OF THE EXEMPLIFIED EMBODIMENT

Figure 1:
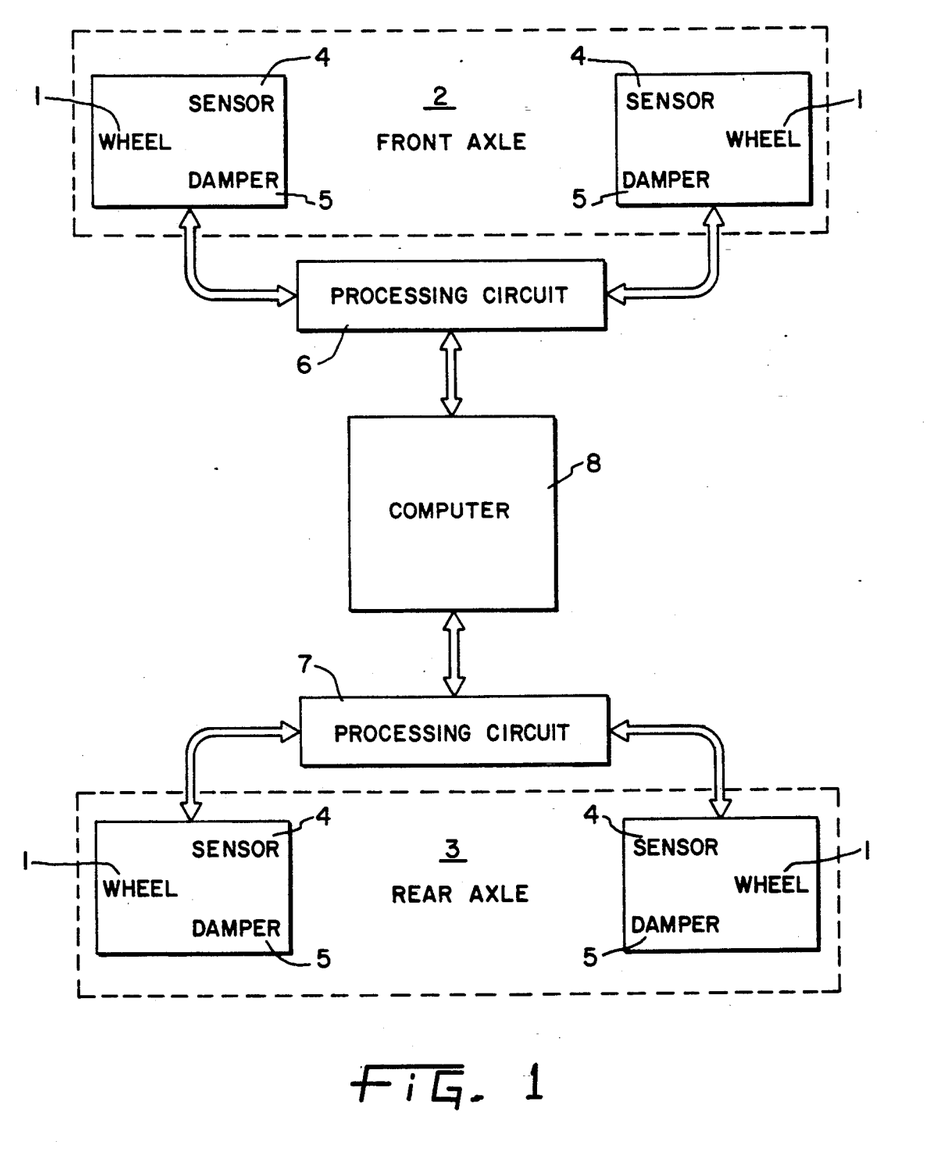
FIG. 1 Block diagram of the semi-active suspension control.

FIG. 1 shows in rough outline the block diagram of a vehicle equipped with a semi-active suspension control. Allocated to each wheel 1 of the front axle 2 and the rear axle 3 are sensors 4 and dampers 5. Each one of the dampers 5 is a semi-active damper. It is characterised by an adjustable valve opening area of a bypass which links communicating chambers of the damper 5, and it has a piston which divides the associated cylinder into the aforementioned communicating chambers. The damper 5 is arranged in the area of each wheel 1 between the wheel support parts (e.g. axle) and the vehicle superstructure. A spring arrangement is parallel with the damper.

The aforementioned assemblies of the front axle 2 and the rear axle 3 are linked to processing circuits 6 and 7 which undertake the processing of the sensor signals and the control signals for the dampers 5. The processing circuits 6 and 7 are connected to a process computer 8.

The overall arrangement is designed to provide a quick, semi-active chassis control, i.e. the data established by the sensors is processed on-line—during the travelling—and is converted into corresponding control signals for the individual semi-active dampers 5, resulting in an optimum travelling comfort, depending on the travelling condition—with maximum travelling safety. Travelling comfort and travelling safety are opposed to each other, since high travelling comfort requires a soft damper characteristic, which however does not ensure adequate travelling safety. A hard damper characteristic provides high travelling safety, but it reduces the comfort. Using the semi-active suspension damping of the invention, the chassis is always damped optimally, depending on the rolling condition and or the driver's requirements, i.e. in critical situations (e.g. braking, fast cornering, etc.), there is correspondingly hard damping, and in non-critical situations (e.g. driving straight ahead at a constant speed), there is soft, comfortable damping. The detailed set-up of the suspension control as provided by the invention is more closely described hereafter.

Figures 2, 3:
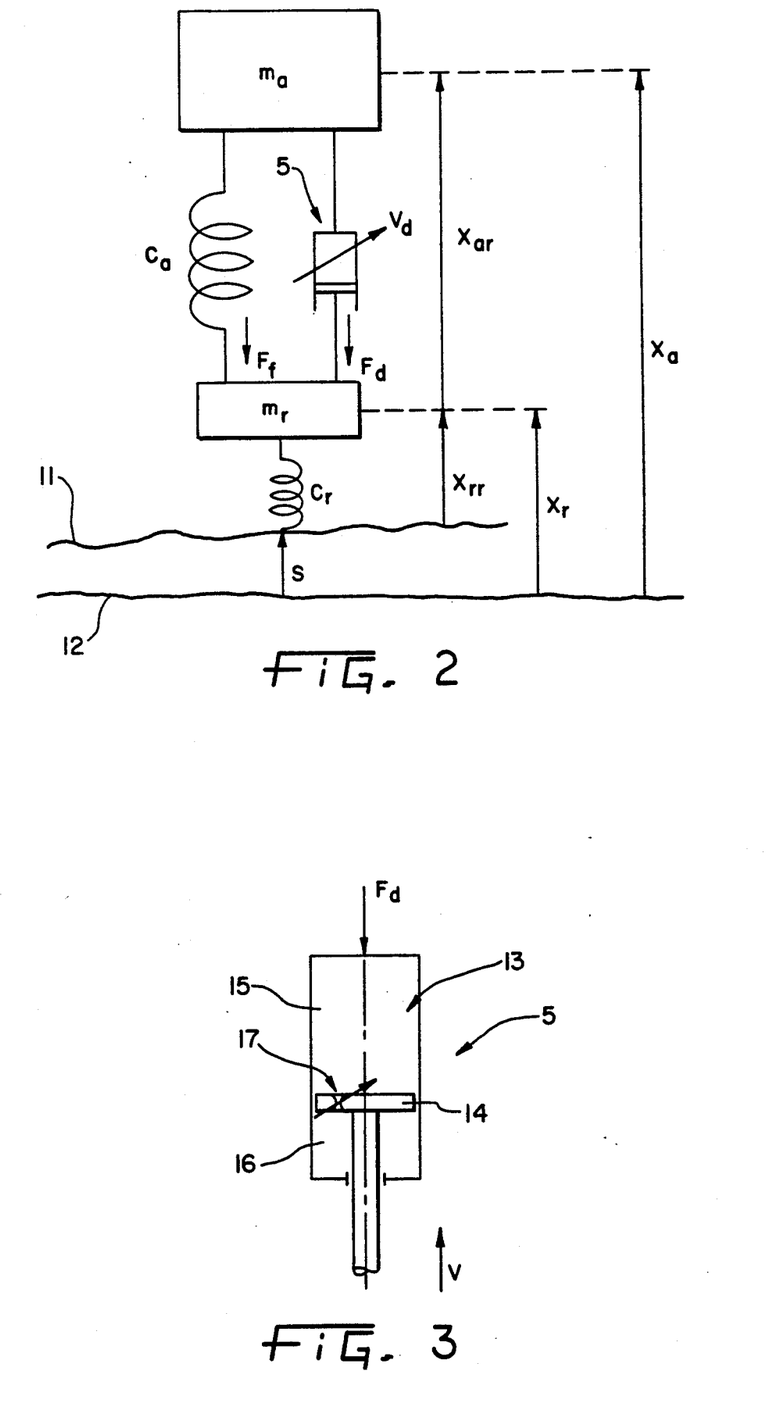
FIG. 2 Model representation of the suspension control in the vicinity of a wheel.
FIG. 3 Diagramatic view of a semi-active damper.

FIG. 2 shows a model representation of a wheel area of the vehicle. The representation of FIG. 2 is also described as a "one wheel model". In a motor vehicle fitted with four wheels 1 there are therefore four such arrangements, with each wheel area having an independent suspension control. Via a spring with the spring force $F_f$, the wheel mass $m_r$ is linked with the vehicle superstructure mass $m_a$. In the one wheel model, the vehicle superstructure mass $m_a$ is that mass proportion of the total mass which can be added to the particular wheel 1. The spring has the constant $c_a$. Parallel with the spring is the already described damper 5 which has the damping force $F_d$ which can be set by means of an actuating voltage $V_d$. Between the wheel mass $m_r$ and the vehicle superstructure mass $m_a$ is the relative spring deflection path $x_{ar}$. The flexible parts of the wheel 1 have been taken into consideration by the spring constant $C_r$. The wheel runs on the roadway 11 which has the road unevenness S. The road unevenness S is ascertained against an inertial frame 12 (vertical component). Starting from this inertial frame 12, there is the wheel path $x_r$ to wheel 1 and the superstructure path $x_a$ to the vehicle superstructure mass $m_a$. Extending between the road unevenness S and the wheel 1 is the relative wheel path $x_{rr}$.

FIG. 3 gives a diagrammatic view the construction of the semi-active damper 5 used. Its cylinder 13 is divided into two communicating chambers 15 and 16. The communicating chambers 15 and 16 are linked via a bypass, the valve opening area of which can be set by the actuating voltage $V_d$. For example, an electromagnetic device controlled by the actuating voltage $V_d$ may have been provided, with which the opening area can be varied. In the interior of the communicating chambers 15 and 16 is a pressure medium (e.g. hydraulic fluid). FIG. 3 further shows the damping force $F_d$ and the piston speed v.

Figure 4:
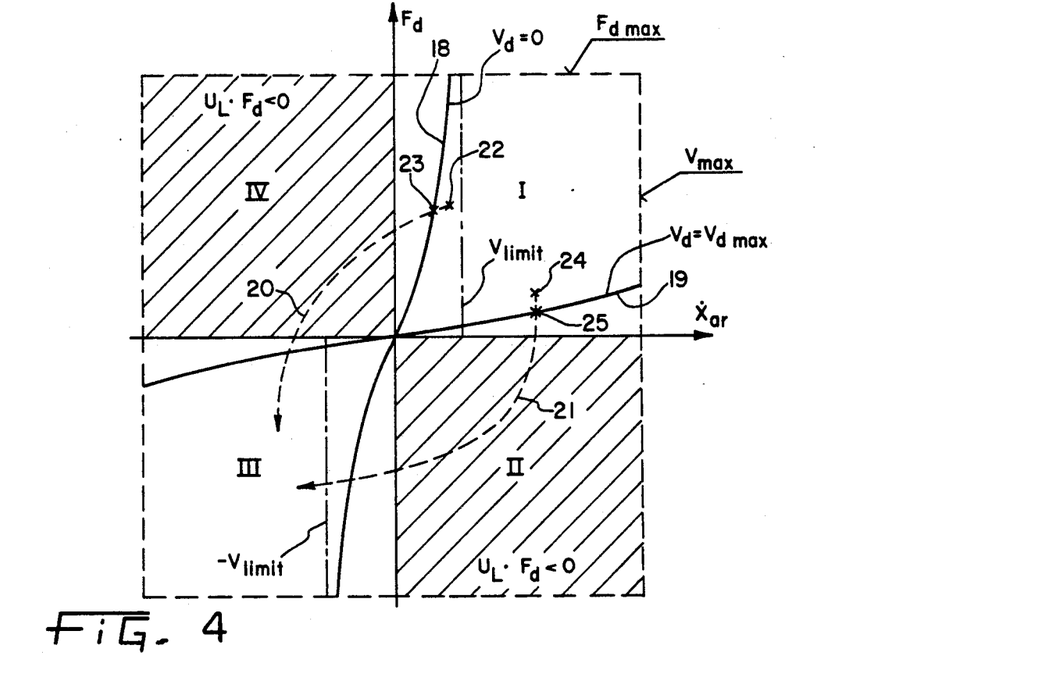
FIG. 4 Diagram of the damping force of the semi-active damper, related to the piston speed, FIG. 5 Block diagram of the suspension control, and FIG. 6 Detailed block diagram of the suspension control.

FIG. 4 shows the damping force/piston speed diagram of the semi-active damper 5. Since only the valve opening area of the bypass 17 is adjustable, i.e. no active pressure build-up can be effected in the communicating chambers 15 and 16, operation is possible only in the first and third quadrants (I, III) of the diagram. Consequently, operating points with positive damper force $F_d$ and positive piston speed v (the piston speed corresponding to the relative spring deflection speed $X_{ar}$) and negative damping force $F_d$ and negative piston speed v can be set. The second and fourth quadrant (II, IV) can be initiated only by an active damper in which the communicating chambers can be actively loaded with a pressure medium. This means that with a positive damping force $F_d$, it is possible to implement even a negative piston speed v, and with a negative damper force $F_d$, a positive piston speed v. Therefore, the second and fourth quadrant (II, IV) in the presented semi-active system is characterised by the equation $$U_1 \cdot F_d < 0$$

The diagram of FIG. 4 is limited by the maximum achievable damping force $F_{dmax}$ and the maximum piston speed $V_{max}$. Two limit characteristics 18 and 19 are also specified. The limit characteristic 18 marks a damping characteristic with maximum hardness; this condition exists with an operating voltage of $V_d = 0$. The limit characteristic 19 concerns a damping characteristic with the maximum possible softness; this is given with an operating voltage of $V_d = V_{dmax}$. The allocation of a bypass opening area and control signal is basically arbitrary. In accordance with the invention, it is selected such that in the event of failure of the control signal, e.g. due to a defect of the electronics, the damper 5 is set as hard as possible (limit characteristic 18), since this operating condition though being extremely uncomfortable is however safe ("fail safe" principle). Further, a pressure control valve is provided which protects the damper 5 from overload in the event of malfunction.

With regard to diagram 4, the semi-active damper 5 can be used only to initiate operating points of the first and third quadrant, which lie between the limit characteristics 18 and 19. For the optimum damping of the suspension in accordance with the invention, the controller (which will be dealt with hereafter in more detail) will calculate, at very short time intervals, the currently required damping force $F_d$ (set-point value) by amount and direction. If this momentarily required damping force $F_d$ is in the quadrant I or III of the diagram, FIG. 4, i.e. if the relationship is:

$$F_d \cdot U_1 \geq 0 \tag{1},$$

then, by appropriate driving of the bypass 17 (FIG. 3), this set-point force can be set. $U_1$ is a control voltage, i.e. this is the output voltage of the aforementioned controller. However, there are travelling conditions for which $$F_d \cdot U_1 < 0 \tag{2},$$

i.e. the momentary damping force (set-point value) is in quadrant II or IV. An active damper reaction is therefore required. This cannot be implemented with the semi-active damper 5. As an alternative, the controller must now effect a damper setting by which the error that occurs is as small as possible, compared to the set-point value. It must now be decided whether a large or a small damping force most closely approaches the set-point force. FIG. 4 sets out to show by means of two examples how this decision is made in accordance with the invention.

EXAMPLE 1

Assuming that the damping force $F_d$ (set-point force) corresponds to point 22 in FIG. 4, in accordance with the last calculation cycle of the controller, and the further progression of the setpoint force of the subsequent calculation cycles corresponds to the progression of the arrow 20, then the damper setting achieved in point 23, which lies on the limit characteristic 18, is of maximum hardness, and shortly afterwards, the quadrant IV is reached. This means that a fairly large damping force will most closely approach the set-point force. In accordance with the invention, the damper is controlled into the position "maximum hard", if and for as long as the following conditions prevail:

$$U_1 \cdot F_d < 0 \tag{2}$$

and $$|v| > V_{limit} \tag{3}$$

The limit speed $V_{limit}$ is a specifiable piston speed. In FIG. 4, it is entered as a dash-dot line in the first and third quadrant.

EXAMPLE 2

Let it be assumed that the damping force (set-point force)—in accordance with the last calculating cycle of the controller—corresponds to point 24 in FIG. 4 and the further progression of the set-point force in the following calculation examples follows the progression of the arrow 21. The damper setting of maximum softness is already reached at point 25, which lies on the limit characteristic 19, and shortly afterwards, the second quadrant is reached. A damping force as small as possible thus approaches most closely the set-point force. According to the invention, the damper is thus controlled with maximum softness, if the conditions $$U_1 \cdot F_d < 0 \tag{2}$$

and $$|v| < V_{limit} \tag{4}$$

are fulfilled. As in the previous example, v signifies the amount of the piston speed v.

Figure 5:
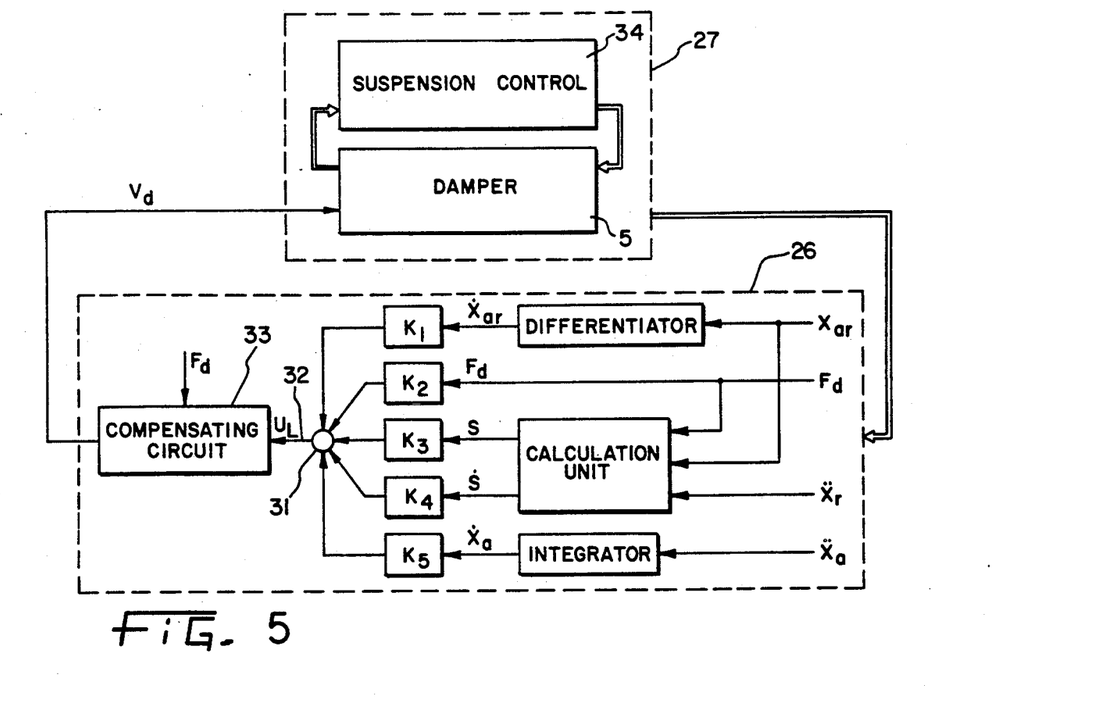
Figure 6:
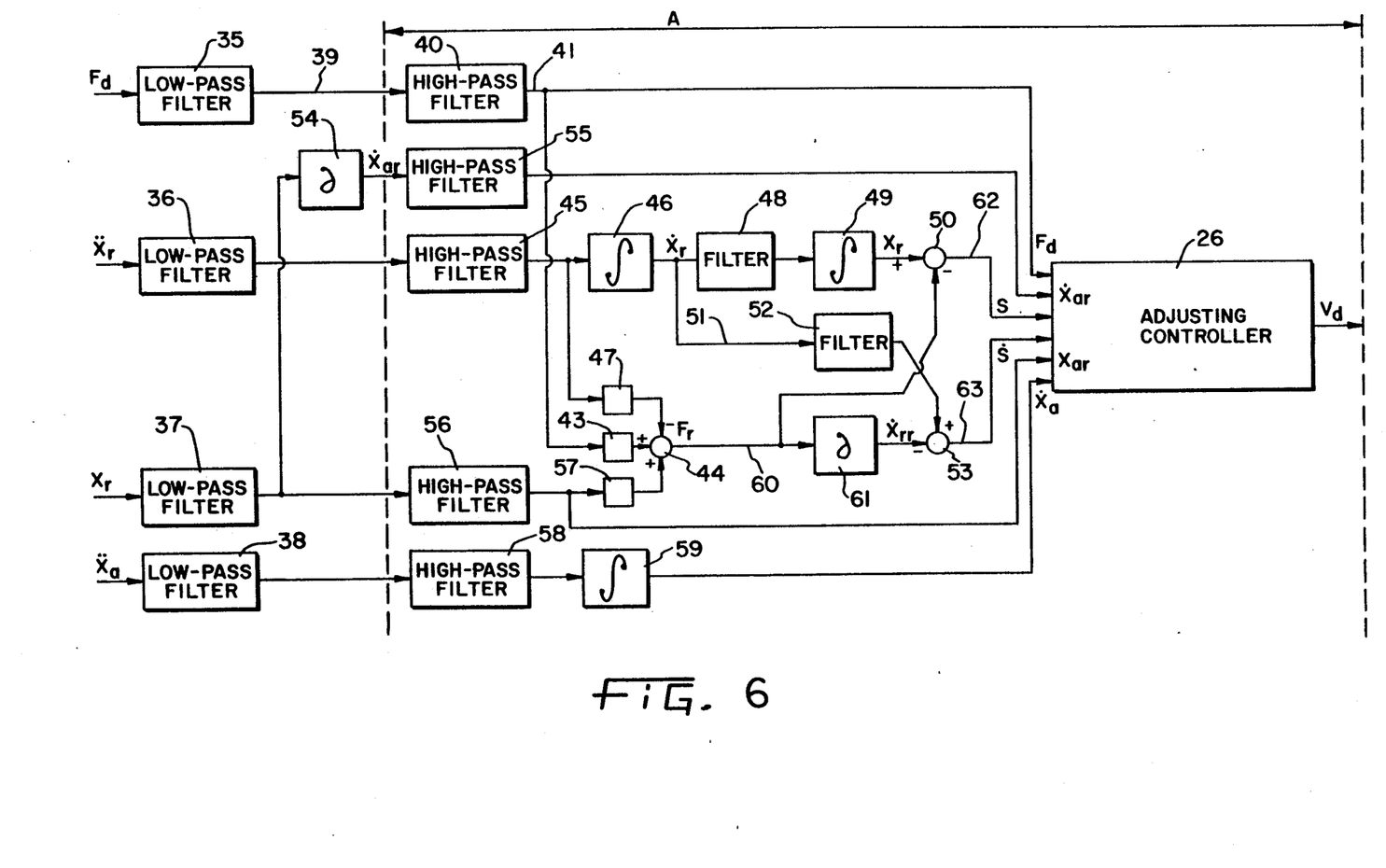

The concrete formation of the suspension control in accordance with the invention is more fully explained in FIGS. 5 and 6.

FIG. 5 shows the controller 26 and a section 27 which forms part of the control circuit. The previously mentioned sensors 4 are provided to cover the relative spring deflection path $x_{ar}$, the damping force $F_d$, the wheel acceleration and the body acceleration $\ddot{x}_a$. The relative spring deflection speed $\dot{x}_{ar}$ is formed from the relative spring deflection path $x_{ar}$. The relative spring deflection path $x_{ar}$, the damping force $F_d$, and the wheel acceleration $\ddot{x}_r$ are used to calculate the unevenness speed $\dot{S}$ and the road unevenness S. The body speed $\dot{x}_a$ is determined—by integration—from the body acceleration $\ddot{x}_a$. The intermediate variables thus obtained are applied, weighted (K1 to K5), to a summation point 31, at the output 32 of which the control voltage $U_1$ is formed. This voltage is fed to a compensating circuit 33 which utilises this to form the actuating voltage $V_d$, taking into account the non-linear control behaviour of the semi-active damper 5. In block 33, the condition $$F_d \cdot U_1 \geq = 0 \tag{1}$$

is monitored. Should the condition not be fulfilled, then the actuating voltage $V_d$ is switched in accordance with the exception rules described above, to $V_d=0$ and to $V_d=V_{dmax}$, respectively. The actuating voltage $V_d$ is connected to the damper 5. The block described 34 of the section 27 indicates the described one-wheel model (FIG. 2).

The detailed set-up will be seen from FIG. 6 where the control conception for a wheel 1 of the vehicle is reproduced. The damping force $F_d$ the wheel acceleration $\ddot{x}_r$, the relative spring deflection path $x_{ar}$, and the body acceleration $\ddot{x}_a$ are fed to low-pass filters 35, 36, 37, and 38 which are designed as anti-aliasing filters. From the low-pass filter 35, there is a lead 39 going to the high-pass filter 40, the output 41 of which applies the now filtered data of the damping force $F_d$ to the adjusting controller 70. The lead 41 continues to an evaluation circuit 43 which is connected to a summation point 44. Evaluation circuit 43 processes its input signal and provides a suitably weighted output, for example by multiplication. The output of the low-pass filter 36 is also connected to a high-pass filter 45 which is itself linked to an integrator 46. The output of the high-pass filter 45 leads to an evaluation circuit 47 which is connected to the summation point 44 with a negative sign. At the output of the integrator 46, the wheel speed $\dot{x}_r$ is available, which is passed—via a filter 48—to another integrator 49, at the output of which is the wheel path $x_r$, which is fed to a summing point 50. The output variable $\dot{x}_r$ (wheel speed) of the integrator 46 is fed to a summation point 53 via a lead 51 and a filter 52. The output of the low-pass filter 37 is connected to a differentiator 54, which—via a high-pass filter 55—feeds the relative spring deflection speed $\dot{x}_{ar}$ to the adjusting controller 70. Furthermore, the output of the low-pass filter 37 is linked to a high-pass filter 56, the output of which leads, via an evaluation circuit 57, to the summing point 44. The output of the high-pass filter 56 is connected to the adjusting controller 70 and provides the relative spring deflection path $x_{ar}$. The output of the low-pass filter 38 is also linked to a high-pass filter 58, the output of which is connected to an integrator 59 which feeds the controller 26 with the body speed $\dot{x}_a$. The output of the summation point 44 passes via a line 60 to a differentiator 61, at the output of which the relative wheel speed $\dot{x}_{rr}$ is available, which is connected—with negative sign—to the summation point 53. The line 60—also with negative sign—is further linked to the summation point 50. The output of summation point 50 is connected to the adjusting controller 70 and provides the road unevenness factor S. The output 63 of the summation point 53 provides the road unevenness speed $\dot{S}$, which is connected to the controller 26. From the mentioned input variables ($F_d$, $\dot{x}_{ar}$, S, $\dot{S}$, $x_{ar}$, and $\dot{x}_a$), the adjusting controller 70 forms the actuating voltage $V_d$.

The low-pass filters 35, 36, and 37 have the transfer functions $$\frac{1}{1 + 2 d_m T_m s + T_m^2 s^2}$$

with $d_m$ having the value of 1.04 and $T_m$ having the value of 500 Hz. The term "s" represents the Laplace operator commonly used in the transfer technology.

The low-pass filter 38 has the transfer function $$\frac{1}{1 + 2 T_n d_n s + T_n^2 s^2}$$

with $d_m = 1.04$ and $T_n = 50$ Hz.

The high-pass filters 40, 45, 55, 56, and 58 have the transfer function $$1 - \frac{1}{(1 + T s)^2}$$

the time constant T is 5 s.

The transfer functions of the integrator 46 and 49, and 59 are $$\frac{T}{T_1} \cdot \frac{1}{1 + T s}$$

where $T_1$ is 0.01019 s with the integrator 46, 0.05 s with the integrator 49, and 0.0510 s with the integrator 59.

For T, 1.0 s is adopted with all three integrators. In the above elaborations, the differentiators 54 and 61 were also mentioned. Their transfer function is $$\frac{T_d s}{1 + 2dTs + T^2 s^2}$$

with $T_d = 0.05$ s, d 0.8, and f = 100 Hz with the differentiator 54, and $T_d = 0.0125$ s, d = 0.8, f = 100 Hz with the differentiator 61.

The circuit 48 has the transfer function $$\frac{1}{1 + Ts}.$$

T has the value of 5 s in circuit 48.

The filter 52 is characterised by the transfer function $$\frac{1}{1 + 2dTs + T^2 s^2},$$

in which d = 0.8, and f = 100 Hz.

At summation point 44, the output of the evaluation circuit 47 is applied with negative sign, and the outputs of the evaluation circuits 43 and 57 with positive signs, as input variables. The wheel path $x_r$ is fed with positive sign, and the signal of line 60 is fed with negative sign to the summation point 50. The output of circuit 52 is applied with positive sign to summation point 53, and the output variable of the differentiator 61 is applied to the output of circuit 52 with negative sign.

The fast, semi-active suspension control in accordance with the invention takes into account the road unevenness $\dot{S}$ and its time related change S under each wheel 1, and the optimum damping force $F_d$ is calculated for each instantaneous value of S and $\dot{S}$ (state controller). Under the conditions given in accordance with the invention, there is the possibility of infinitely varying the adjustable damping force $F_d$, virtually from the zero damping to an extremely hard damping. A fast process computer is preferably used to process the established data. In particular, an optimum wheel load distribution occurs in order to influence the steering behaviour in such a way that on steering into a bend, there is oversteering, and on returning to straight-ahead driving, there is understeering behaviour. The components represented in FIG. 6 within the range A, separated by vertical, dotted lines, are preferably implemented in digital technology. Power controlled throttle actuators can be used as dampers 5, in which the change of the cross-section of the through-flow aperture can be made by a lifting magnet, for example, or by a rotary magnet. For speedy control, a large ratio of variation of the throttle cross-section is preferably provided (e.g. 0.7 mm² to 45 mm²). It is also possible to use an electrorheological power actuator which is based on the principle that with special fluids, the transverse strain between a wall and the fluid is controllable by virtue of applying an electrostatic field. If the piston of the damper is moved, then the fluid will flow through the ring gap between thin-wall pipes which are polarised dependent on the control voltage. The damping force is almost independent of the damping speed, it is essentially determined by the strength of the electrostatic field.

The method in accordance with the invention enables the dampers to be set with such softness as to give a damping force of approximately zero. Practically achievable values are around 300N/(m/s). For the maximum hardness of damper setting, values around 17 kN/(m/s) can be obtained. In practical motoring, the setting of the dampers varies constantly between these extreme values. It is therefore no longer possible to describe the dampers by means of a damper characteristic. The damper must rather be seen as a freely controllable power generator.

The system in accordance with the invention further enables a passive damper to be simulated. The passive damper can be simulated by the appropriate controller software. This makes it possible, for example, to locate a suitable passive damper in a simple manner for a newly developed vehicle. It is no longer necessary to fit and dismantle passive dampers in succession in prolonged trials in order to experiment with the optimum, but through the simulation of a passive damper with the required properties, it is possible to determine its characteristic curve in a simple manner, which can then be easily implemented on the test rig on passive dampers. This enables the test series for a newly developed suspension or vehicle to be decisively reduced.

We claim:

1. A process for the undercarriage control of vehicles, particularly of passenger cars and trucks, the vehicles having a plurality of semiactive shock absorbers arranged between the vehicle superstructure and the wheels, each semiactive shock absorber including a cylinder subdivided into two working spaces by a piston wherein a fluid may flow through a variable valve from one working space to the other, each valve being adjustable dependant on factors of absorber force and piston velocity when a factor pair falls within specific limits and each valve being adjustable according to maximally soft or maximally hard shock absorber settings when the factors fall outside said specific limits, said process comprising the steps of:

determining the piston velocity of the shock absorbers;

determining the dynamic state of vehicular travel and processing the determined state of travel for calculation of factors of shock absorber force and piston velocity for each shock absorber to provide a momentarily optimal shock absorber force; and adjusting each valve according to the momentarily optimal shock absorber force and the corresponding factor pair of calculated shock absorber force and piston velocity, wherein:

(1) if the corresponding factor pair of calculated shock absorber force and piston velocity falls within said specific limits, the corresponding valve is adjusted dependent on the piston velocity, and (2) if the corresponding factor pair of calculated shock absorber force and piston velocity falls outside said specific limits, the corresponding valve is adjusted to said maximally soft or maximally hard shock absorber setting depending on which of the two shock absorber settings most closely approximates the effect of the momentarily optimal shock absorber force applied to the determined dynamic state of vehicular travel.

2. The process of claim 1 wherein said step of determining the state of vehicular travel utilizes input variables including relative spring deflection path, wheel acceleration, damping force, body acceleration, road unevenness, and road unevenness speed.

3. The process of claim 1 wherein said step of calculating desired factors includes selecting damping forces so that during steering the vehicles into a bend, slight oversteering is produced, and during return to straight-ahead driving, a slight understeer is produced.

4. The process of claim 1 wherein said adjusting step includes activation of electrorheological fluid in the semi-active dampers.

5. The process of claim 1 wherein said adjusting step, if the factor pair of shock absorber force and piston velocity falls outside said specified limits, includes utilizing the piston velocity at the time of reaching the specified limit for deciding whether the maximally soft or maximally hard shock absorber setting approximates the optimal shock absorber force the closest.

6. The process of claim 5 wherein said step of deciding whether the maximally soft or maximally hard shock absorber setting approximates the optimal shock absorber the closest includes comparing the piston velocity at the time of reaching said specified limits with a threshold value, and said adjusting step includes effecting said maximally hard shock absorber setting if the amount of the piston velocity is smaller than said threshold value, while said adjusting step includes effecting said maximally soft shock absorber setting if the amount of the piston velocity is greater than said threshold value.

7. A device for suspension control on vehicles, particularly of passenger cars and trucks, the vehicles having a superstructure and wheels, said suspension control device comprising:

a plurality of semiactive shock absorbers, each said semiactive shock absorber including a cylinder adapted to contain a fluid and being subdivided into two working spaces by a piston, said piston including a variable valve for fluid communication from one working space to the other, each said variable valve being adjustable depending on a factor pair of absorber force and piston velocity when said factor pair falls within specific limits and each said variable valve being adjustable according to maximally soft or maximally hard shock absorber settings when the factor pair falls outside said specific limits; and means for adjusting said variable valve, said adjusting means comprising means for determining the piston velocity of said shock absorbers, means for determining the dynamic state of vehicular travel, and means for calculating factors of shock absorber force and piston velocity for each said shock absorber to provide a momentarily optimal shock absorber force, said adjusting means controlling each said variable valve according to the momentarily optimal shock absorber force and said corresponding factor pair of calculated shock absorber force and piston velocity, said adjusting means operating such that:

(1) if said corresponding factor pair of calculated shock absorber force and piston velocity falls within said specific limits, said adjusting means adjusts said corresponding variable valve dependent on the piston velocity, and (2) if said corresponding factor pair of calculated shock absorber force and piston velocity falls outside said specific limits, said adjusting means adjusts said corresponding variable valve to said maximally soft or maximally hard shock absorber settings most closely approximates the effect of the momentarily optimal shock absorber force applied to the determined state of vehicular travel.

* * * * *

UNITED STATES PATENT AND TRADEMARK OFFICE
CERTIFICATE OF CORRECTION

PATENT NO. : 5,189,615
DATED : February 23, 1993
INVENTOR(S) : Erich Rubel, et al It is certified that error appears in the above-identified patent and that said Letters Patent is hereby corrected as shown below:

Claim 7, column 12, line 33, before "settings" insert therefor --setting depending on which of the two shock absorber--.

Signed and Sealed this

Twenty-third Day of November, 1993

Attest:

BRUCE LEHMAN

Attesting Officer     Commissioner of Patents and Trademarks